United States Patent [19]

Orser

[11] Patent Number: 4,846,026

[45] Date of Patent: Jul. 11, 1989

[54] PLUG INSERTION TOOL

[76] Inventor: Harvey E. Orser, 123 Mark, Pontiac, Mich. 48053

[21] Appl. No.: 295,590

[22] Filed: Jan. 11, 1989

[51] Int. Cl.4 .............................................. B60C 25/16
[52] U.S. Cl. ..................................................... 81/15.7
[58] Field of Search ....................... 81/15.5, 15.7, 15.2

[56] References Cited

U.S. PATENT DOCUMENTS

| | | | |
|---|---|---|---|
| 3,073,191 | 1/1963 | Sharpe | 81/15.7 |
| 3,714,851 | 2/1973 | Orser | 81/15.7 |
| 3,783,715 | 1/1974 | Niconchuk | 81/15.7 |
| 3,785,896 | 1/1974 | Kassel | 81/15.7 |

Primary Examiner—Roscoe V. Parker

[57] ABSTRACT

A tool for inserting rubber tire repair plugs into an injury or a hole of a vehicle tire is disclosed which is an improvement of the invention disclosed in U.S. Pat. No. 3,714,851. The improvements on the previously issued U.S. Patent consist of a y-shaped eye at the end of the needle, a plurality of notches and a handle so that needle changing is avoided. Additionally, a protrusion is used to abut the opposite end of a plug from that which is being inserted into the tire to prevent its movement and to further assist in asserting into the injury in the tire.

1 Claim, 1 Drawing Sheet

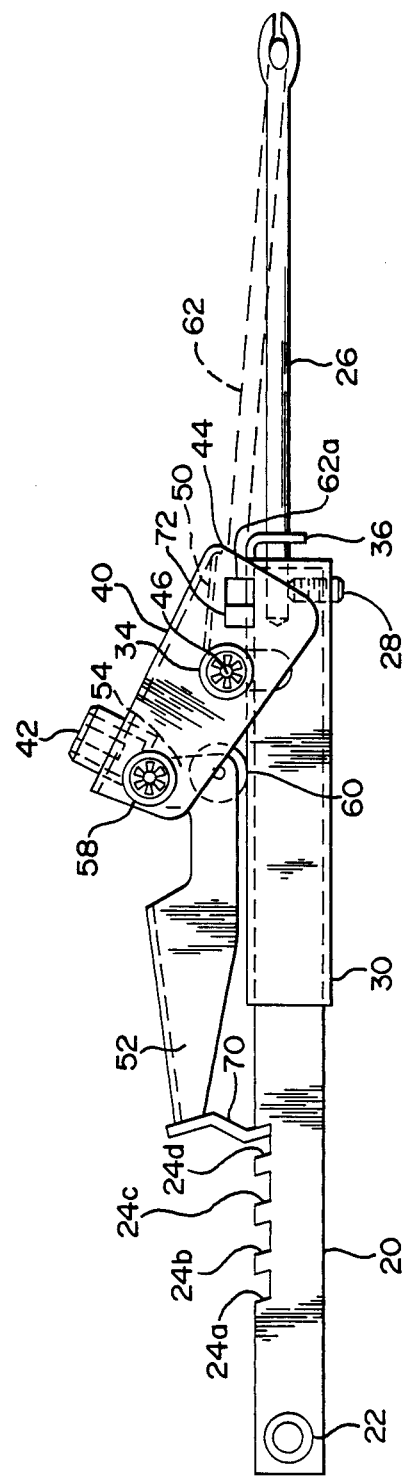

PLUG INSERTION TOOL

BACKGROUND OF THE INVENTION

1. Field of the Invention

This invention relates to a tool for inserting rubber tire repair plugs into an injury or a hole of a vehicle tire.

The primary object of this invention is to present an improvement of my previously issued U.S. Pat. No. 3,714,851 which present improvements thereof make it easier to insert a plug into an injury or hole of a vehicle tire, as well as to hold the plug in place during the insertion process. Additionally, an improvement is herein disclosed which obviates the need of having needles of different length.

Another object of this invention is to pre-stretch the plug in order to make it smaller for easier insertion and minimization of plug breakage.

Another object of this invention is obtaining a tighter fit in the hole accomplished by contraction of the plug when released from its stretched position.

A further object of this invention is the prevention of plug loss inside the tire by automatically stopping the plug insertion at the correct depth. A further object of this invention is the prevention of plug loss inside the tire by providing a needle having a closed y-shaped eye which better holds the plug. An additional object of this invention is the provision of a tool which is simple, effective, and efficient.

DESCRIPTION OF THE RELEVANT ART

The most closely related United States Patent as previously mentioned is U.S. Pat. No. 3,714,851. As stated before the present invention overcomes inadequacies found in the use of U.S. Pat. No. 3,714,851.

SUMMARY OF THE INVENTION

The present resilient tire repair plug inserter includes an elongate shaft, a handle bar secured to one end of the shaft, a needle having a y-shaped eye rigidly secured in the end of the shaft opposite said handle bar and extending longitudinally outwardly therefrom, a housing longitudinally and slidably mounted on the shaft and the needle, means on the housing for clamping against the housing the ends of a resilient tire plug centrally mounted in the y-shaped needle eye, a handle on the last named means for moving the housing toward the handle bar for stretching the plug, and a downwardly dependent protrusion on the handle for lodging in any one of a plurality of notches on the shaft for releasably securing the housing in a plug stretching position, and a protrusion on the housing against which an end of a resilient tire repair plug may abut which impedes its movement.

BRIEF DESCRIPTION OF THE DRAWINGS

FIG. 1 is a side elevational view of invention 10 which is substantially like FIG. 2 of U.S. Pat. No. 3,714,851 of which this is an improvement thereof.

DESCRIPTION OF THE PREFERRED EMBODIMENTS

Referring in detail to FIG. 1, there is shown a shaft 20, a handle bar 22 secured transverse therewith at one end thereof, notches 24a, b, c, d in the top surface of shaft 20 having a longitudinal axis transverse with that of shaft 20 and having a parallelogram cross section, a needle 26 extending out from the other end of shaft 20 parallel with the longitudinal axis thereof, and a set screw 28 inserted in the bottom of shaft 20 to secure needle 26 in place. A tubular housing 30 with a square cross section capable of slidable movement about said screw 28, a pair of tabs 34 partially punched out of the vertical sides of housing 30 and bent 180 degrees for extension above the top sides of housing 30, and a support projection 36 extending downward from the top side of housing 30 at the rear end thereof and having a hole therein through which needle 36 is inserted for support and proper alignment is slidably mounted over shaft 20 near the rear end thereof. A three sided jaw 40 with an adjusting screw 42 inserted in the top side thereof and a tooth 44 extending downward from and transverse with the top side of jaw 40 at the rear end pivotally mounted partially above housing 30 by means of a pin 46 mounted between a set of tabs, not shown, and inserted in the vertical sides of jaw 40. A spring 50 mounted on pin 46 physically contacts the top side of housing 30 and the bottom surface of the top side of jaw 40 biasing jaw 40 upward at the rear end thereof. A handle 52 has a pair of legs 54 with a hole in each and each vertical side of jaw 40 has a longitudinal slot, not shown, therein aligned with the holes of legs 54 through which a pin 58 is inserted and mounted. At the front ends of legs 54 roller means 60 mounted between legs 54 and physically contact the top side of housing 30. The top of front end of handle 52 has a projection 70 extending therefrom at an angle so that the bottom surface of projection 70 is pressed only against the abutment of the top surface of shaft 20 and the rear side of the parallelogram formed by notches 24a, b, c and d forming a slip free lock at which time plug 62 is in its fully stretched position for insertion in the hole. Additionally, plug 62 is kept from longitudinal movement towards handle bar 22 by stop 72 against which plug end 62a abuts. Furthermore, notches 24a, b, c and d make it unnecessary to change needle 26. Additionally, needle 26 has a y-shaped end which holds plug 62 as it is inserted into an injury in a tire, not shown.

While the preferred embodiment of this invention has been illustrated and described, it should be understood by those skilled in the art that many changes and modifications may be restored to without departing from the spirit and scope of this invention.

I claim:

1. A resilient tire repair plug inserter comprising, in combination: an elongate shaft, a handle bar secured to one end of the shaft, a needle having a y-shaped eye rigidly secured in the end of the shaft opposite said handle bar and extending longitudinally outwardly therefrom, a housing longitudinally and slidably mounted on said shaft and said needle, means on said housing for clamping against said housing the ends of a resilient tire plug centrally mounted in said y-shaped needle eye, a handle on said last named means for moving said housing toward said handle bar for stretching said plug, and a downwardly dependent protrusion on said handle for lodging in any one of a plurality of notches on said shaft for releaseably securing said housing in a plug stretching position, and a protrusion on said housing against which an end of a resilient tire repair plug may abut which impedes its movement.

* * * * *